United States Patent
Stolle

(10) Patent No.: US 7,702,007 B2
(45) Date of Patent: Apr. 20, 2010

(54) ADJUSTING A TRANSMIT POWER SPECTRUM OF A TRANSMIT/RECEIVER DEVICE OF A COMMUNICATION NETWORK

(75) Inventor: Reinhard Stolle, Neufahrn (DE)

(73) Assignee: Infineon Technologies AG, Munich (DE)

( * ) Notice: Subject to any disclaimer, the term of this patent is extended or adjusted under 35 U.S.C. 154(b) by 856 days.

(21) Appl. No.: 11/484,841

(22) Filed: Jul. 11, 2006

(65) Prior Publication Data

US 2008/0013611 A1 Jan. 17, 2008

(51) Int. Cl.
*H04B 1/38* (2006.01)
(52) U.S. Cl. .................. 375/222; 375/219; 375/220; 375/221
(58) Field of Classification Search .......... 375/219, 375/220, 221, 222
See application file for complete search history.

(56) References Cited

U.S. PATENT DOCUMENTS

| | | | | |
|---|---|---|---|---|
| 6,631,120 | B1 * | 10/2003 | Milbrandt | 370/252 |
| 6,633,545 | B1 * | 10/2003 | Milbrandt | 370/252 |
| 6,636,603 | B1 * | 10/2003 | Milbrandt | 379/399.01 |
| 7,072,391 | B2 * | 7/2006 | Oksman et al. | 375/222 |
| 2002/0150122 | A1 * | 10/2002 | Arai | 370/465 |
| 2007/0259680 | A1 * | 11/2007 | Stolle et al. | 455/522 |

OTHER PUBLICATIONS

ITU-T Recommendation G.993.1, "Very high speed digital subscriber line", Jun. 2004, pp. 12, 117, 210-211 (4 pages).
ITU-T Recommendation G.993.2, "Very high speed digital subscriber line 2", Feb. 2006, pp. 36-37, 49-50, 149-170, 247 (27 pages).
ITU-T Recommendation G.997.1, "Physical layer management for digital subscriber line (DSL) transceivers", May 2003, pp. 39, 42, 60, 101-103 (6 pages).
T1E1.4/2003- 210R1, "Very-high-bit-rate Digital Subscriber Line (VDSL) Metallic Interface", ANSI T1.424, 2004, pp. 18-19, 130 (3 pages).
TS 101 270-1 V2.0.10 (May 2003), "Transmission and Multiplexing (TM); Access transmission systems on metallic access cables; Very high speed Digital Subscriber Line (VDSL); Part 1: Functional requirements", May 2003, pp. 28-29, 46, (3 pages).

* cited by examiner

*Primary Examiner*—Chieh M Fan
*Assistant Examiner*—Siu M Lee
(74) *Attorney, Agent, or Firm*—Maginot Moore & Beck

(57) ABSTRACT

A device for adjusting a transmit power spectrum of a first transmit/receive device of a communication network, comprising a means for receiving a measure for an attenuation which a signal experiences on a line from the first transmit/receive means to a first subscriber device of the communication network connected to the first transmit/receive means, from the first subscriber device, and a means for determining the transmit power spectrum of the first transmit/receive means for a communication of the first transmit/receive means with the first subscriber device based on the received attenuation measure.

17 Claims, 5 Drawing Sheets

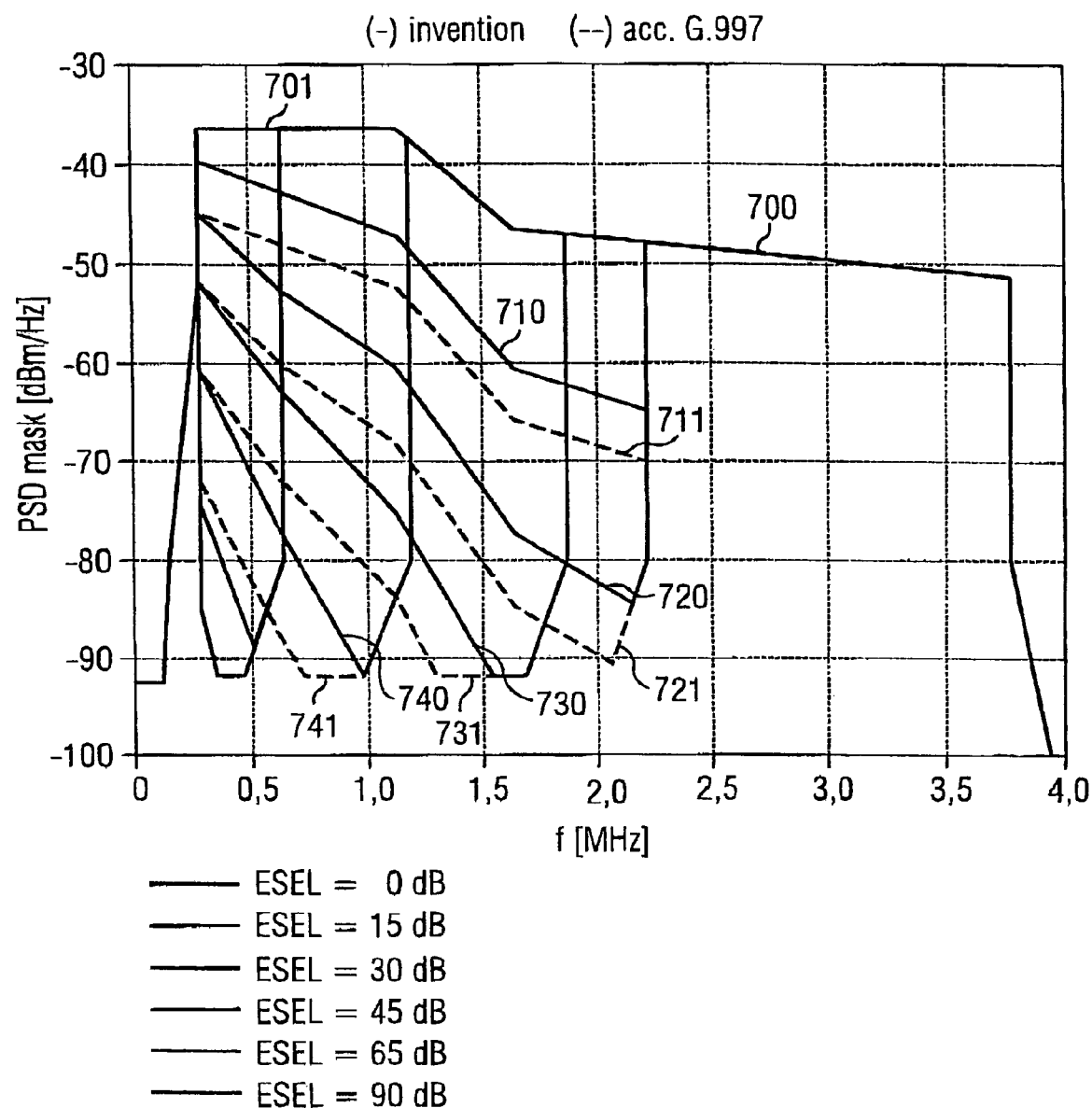

ADJUSTING A TRANSMIT POWER SPECTRUM OF A TRANSMIT/RECEIVER DEVICE OF A COMMUNICATION NETWORK

BACKGROUND

The present invention relates to adjusting a transmit power spectrum of a transmit/receive device of a communication network, as it is, for example, required in DSL technology (DSL=digital subscriber line).

Due to the plurality of pairs of wires in a telephone cable from a central office (CO) to connected subscribers or subscriber devices, respectively, crosstalk occurs despite a direct current insulation of the pairs of wires, both near-end crosstalk (NEXT) and also far-end crosstalk (FEXT). The same result from capacitive or inductive couplings. By twisting the individual pairs of wires of a cable, this crosstalk is minimized so far that it may be neglected in the voice band. In data transmission technologies, like e.g. DSL technology, however, apart from the voice band further frequency ranges are used, in which this crosstalk has a very strong effect on the possible range and transmission speed.

Near-end crosstalk means, that a transmitter on the "near side" of a receive device, i.e. both receive device and also transmitter are part of different subscriber terminal devices or both receive device and also transmitter are part of the central office, overcouples transmit signal portions into the receive branch of the receive device.

In contrast to that, far-end crosstalk means, that, in addition to the receive signal determined for the same, sent from a far-end first transmitter, i.e. first transmitter and receiver are on different sides of subscriber and central office side, a receiver receives portions of a second transmit signal sent from a far-end second transmitter, i.e. also second transmitter and receiver are on different sides.

In an xDSL network, wherein "x" stands for different implementations of DSL technology, the subscriber devices (CPE=customer premises equipment) are typically in a different distance from the central office (CO). A so called near-far problem results from this. If all subscriber devices of the network transmitted with the same transmit power spectral density (TX-PSD, transmit power spectral density), the CPEs closer to the CO would respectively couple a high amount of crosstalk into the lines of the CPE further away from the CO and thus cause differently strong interference power spectral densities of the individual subscribers.

It is sometimes the case, that in an xDSL network ADSL lines (ADSL=asymmetric digital subscriber line) are laid together with VDSL lines (VDSL=very high speed digital subscriber line) in cable bundles. Due to higher data rates of VDSL systems, VDSL central offices are generally installed closer to the corresponding connected VDSL subscribers than comparable ADSL central offices with regard to their connected ADSL subscribers. The lines respectively starting from the central offices are combined in cable bundles and led in parallel at the end of the subscriber side for a few hundred meters, so that, for example, newly installed VDSL systems generate interferences by cross-talk on existing ADSL lines.

For this reason, within the scope of VDSL standardization (VDSL=very high speed digital subscriber line)(see ITU-Standards G.993.1, G.993.2, G.997, ANSI-Standard T1.424-2004, ETSI-Standard TS101-270), a so-called Downstream Power Back-Off (DPBO) is defined. This is a method for protecting existing ADSL lines. It is the aim of the DPBO to form a transmit power spectral density (TX-PSD) at the VDSL central office side, such that the interference power spectral density caused by a VDSL wire pair on an ADSL subscriber side by far-end cross-talk comprises the same value as the FEXT-PSD generated at the same ADSL subscriber by a neighboring ADSL wire pair.

The indicated standards define a method which approximates the request for a respectively equal interference power density of the wire pairs at the CO by realizing the respectively equal receive power spectral density (RX-PSD). By this approximation, subscribers on shorter lines cause a lower FEXT-PSD than subscribers on longer lines. This disadvantage may be avoided by a correction value. The correction value depends on an electrical length or attenuation (EL, in dB), respectively, of the ADSL lines on a line length according to the distance between the ADSL central office and the VDSL central office, and on the electrical length or attenuation (CL, in dB), respectively, of the VDSL lines between the VDSL central office and the VDSL subscribers. To the TX-PSD in dBm/Hz determined according to the standardized method, a correction value $$a_{corr} = 10 \cdot \log_{10}\left(1 + \frac{EL}{CL}\right) dB \quad (1)$$

is added. The line attenuations or electrical lengths EL and CL, respectively, may alternatively also be indicated in meters, as the ratio EL/CL does not depend on that.

The value EL is generally known to a VDSL network operator and may be taken, for example, from a database for the configuration of the VDSL system. The value CL, however, is different for each VDSL terminal line and thus unknown in the configuration of the VDSL system. Usually, here a suitable mean value is selected. If the selected mean value of the electrical length CL is greater than an actual electrical length or line attenuation, respectively, for a VDSL subscriber, then the correction value $a_{corr}$ for the VDSL subscriber is accordingly too low. If, on the other hand, the mean value of CL is smaller than the actual electrical length or line attenuation, respectively, of a subscriber line, then the associated correction value $a_{corr}$ is too high, i.e. independent of EL. That means, that in line bundles mainly including short VDSL lines, via the VDSL lines a clearly lower data rate is transmitted than would be possible with an exact knowledge of the subscriber-specific (VDSL subscribers) values for CL. Further, this means, on the other hand, that in line bundles mainly including long VDSL lines, the VDSL lines cause clearly more cross-talk than ADSL lines running in parallel in the line bundles and thus an ADSL system is only insufficiently protected.

This means that a request for equal downstream conditions with the use of a mean value for CL for calculating the correction value $a_{corr}$ may only be achieved insufficiently.

BRIEF SUMMARY

One embodiment of the present invention includes a device for adjusting a transmit power spectrum of a first transmit/receive means of a communication network, having a means for receiving a measure for an attenuation which a signal experiences on a line from the first transmit/receive means to a first subscriber device of the communication network connected to the first transmit/receive means, from the first subscriber device, and a means for determining the transmit power spectrum of the first transmit/receive means for a communication of the first transmit/receive means with the first subscriber device based on the received attenuation measure.

A further embodiment of the present invention includes a central office having a transmit/receive modem comprising a transmit data input, a receive data output, an external interface capable of being coupled to a first subscriber device via a line, and a transmit power spectrum adjustment input, and a transmit power spectrum adjuster comprising an output capable of being coupled to the transmit power spectrum adjustment input, and an input coupled to the receive data output.

BRIEF DESCRIPTION OF THE SEVERAL VIEWS OF THE DRAWINGS

In the following, embodiments of the present invention are explained in more detail with reference to the accompanying drawings, in which:

FIG. 7 shows an illustration of DPBO transmit power density spectrums obtained according to an embodiment of the present invention.

DETAILED DESCRIPTION

Figure 1:
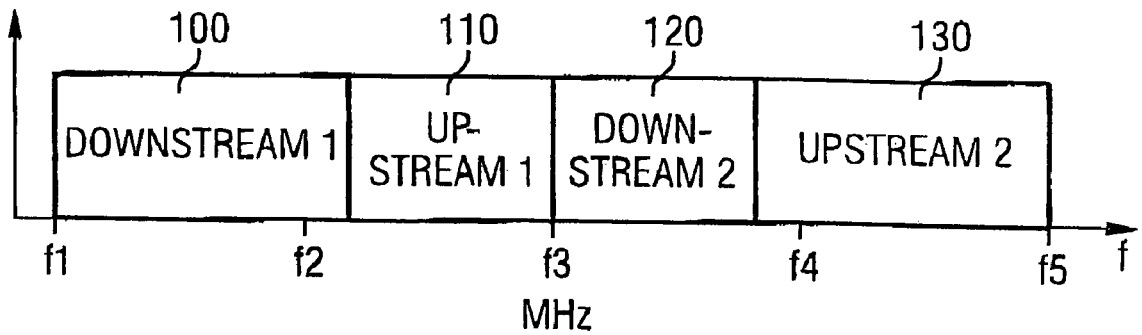
FIG. 1 shows a schematical illustration of a VDSL frequency plan.

With regard to the following description it should be noted, that in the different embodiments equal or equally operating functional elements have the same reference numerals and thus the descriptions of those functional elements are exchangeable in the different embodiments illustrated in the following.

FIG. 1 shows the division of the frequency spectrum into individual bands according to the VDSL standard, to make the following embodiments for the UPBO scenario clearer, for example relating to VDSL or VDSL2, respectively, and in particular to simplify the understanding according to which criteria the correction value $a_{corr}$ is determined in embodiments of the present invention.

FIG. 1 shows an illustration of a relevant frequency range which is divided into four different subfrequency bands. The division of the frequency range corresponds to that of the VDSL transmission technology. A first frequency range 100 defines a first frequency band for the downstream, i.e. the transmission direction from CO to CPE. A second higher-frequency frequency range 110 defines a first frequency band for the upstream data transmission, i.e. the direction from CPE to CO. A next higher-frequency frequency range 120 forms a second frequency subband for the downstream data transmission. Finally, the highest-frequency frequency range 130 forms a second frequency subband for the upstream data transmission. Of course, the present invention is also applicable with other transmission technologies apart from VDSL, in particular ones with more upstream and downstream bands, as it for example occurs in VDSL2, where for downstream and upstream currently respectively up to three frequency bands are used. As it may be seen from the bandwidths of the individual subbands, in the respective subbands differently high transmission rates may be obtained. Thus, for example in the downstream frequency band 100 (DS1), higher data rates may be obtained than in the downstream frequency band 120 (DS2). The respectively used bandwidths within the subbands DS1 and DS2 depend on the respective line attenuation between CO and CPE.

Discrete multitone transmission (DMT) is the designation for the modulation method used in VDSL. DMT is a multi-carrier method, in which the bit information is encoded onto several carrier frequencies for data respectively comprising a certain bandwidth. The serial data stream to be transmitted is combined at the transmit side in DMT to a respective number of bits and mapped to complex subsymbols by inverse spectral transformation, which are sent in parallel on many neighboring carriers. For this purpose, they are simultaneously modulated onto the available carrier frequencies whose sum signal is then transmitted. The carriers may be adjusted to be differently strong. By this it becomes possible to compensate the non-ideal frequency response of concrete telephone lines. Each carrier may be modulated with another bit density, depending on how noisy it is. For example, the carriers with lower frequencies, where the interferences are usually less, may be modulated with a higher data rate, the carriers with higher frequencies with a correspondingly lower data rate. In extreme cases, individual carriers may also be completely blocked.

Figure 2:
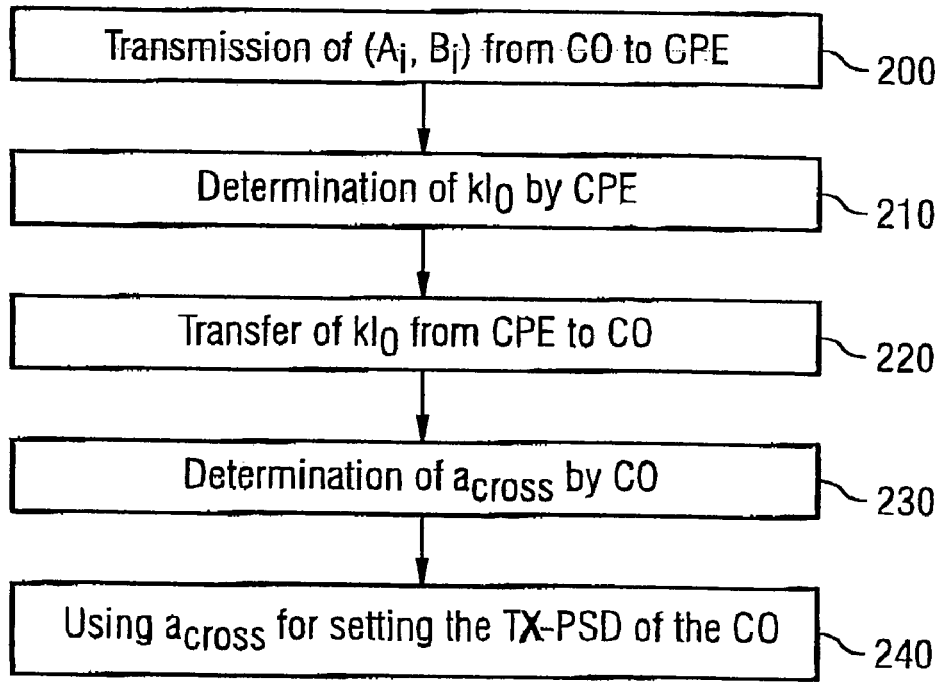
FIG. 2 shows a flowchart for illustrating a method for adjusting the transmit power density of a transmit/receive device according to an embodiment of the present invention.

FIG. 2 shows a flowchart for illustrating the procedure for adjusting the transmit power spectral density of a transmit/receive device or a VDSL central office, respectively, according to an embodiment of the present invention.

In a first step 200, for example from the VDSL-CO to the respectively connected CPE, for any upstream frequency bands i, i.e. for example US1 and US2, shaping coefficients ($A_i$, $B_i$) are sent for a frequency-dependent shaping of a transmit power spectrum of the CPE.

In a second step 210 by the CPE an attenuation coefficient or an electrical length $kl_0$, respectively, of the VDSL line is determined. This is performed by the CO transmitting a previously known signal to the CPO via the respective wire pair during a training phase, whose receive spectrum is calibrated by the CPE in order to estimate $kl_0$ therefrom and using information about the original central office-side transmit power of the signals.

In a subsequent step 220, the determined attenuation coefficient $kl_0$ is transferred from the CPE to the CO. In a fourth step 230 the CO determines, based on the attenuation coefficient $kl_0$ received from the CPE, the correction value $a_{corr}$ for the connected VDSL subscriber. Finally, the VDSL-CO uses the correction value $a_{corr}$ in a step 240 for adjusting its TX-PSD for the subscriber, as it is explained in more detail in the following.

Figure 3:
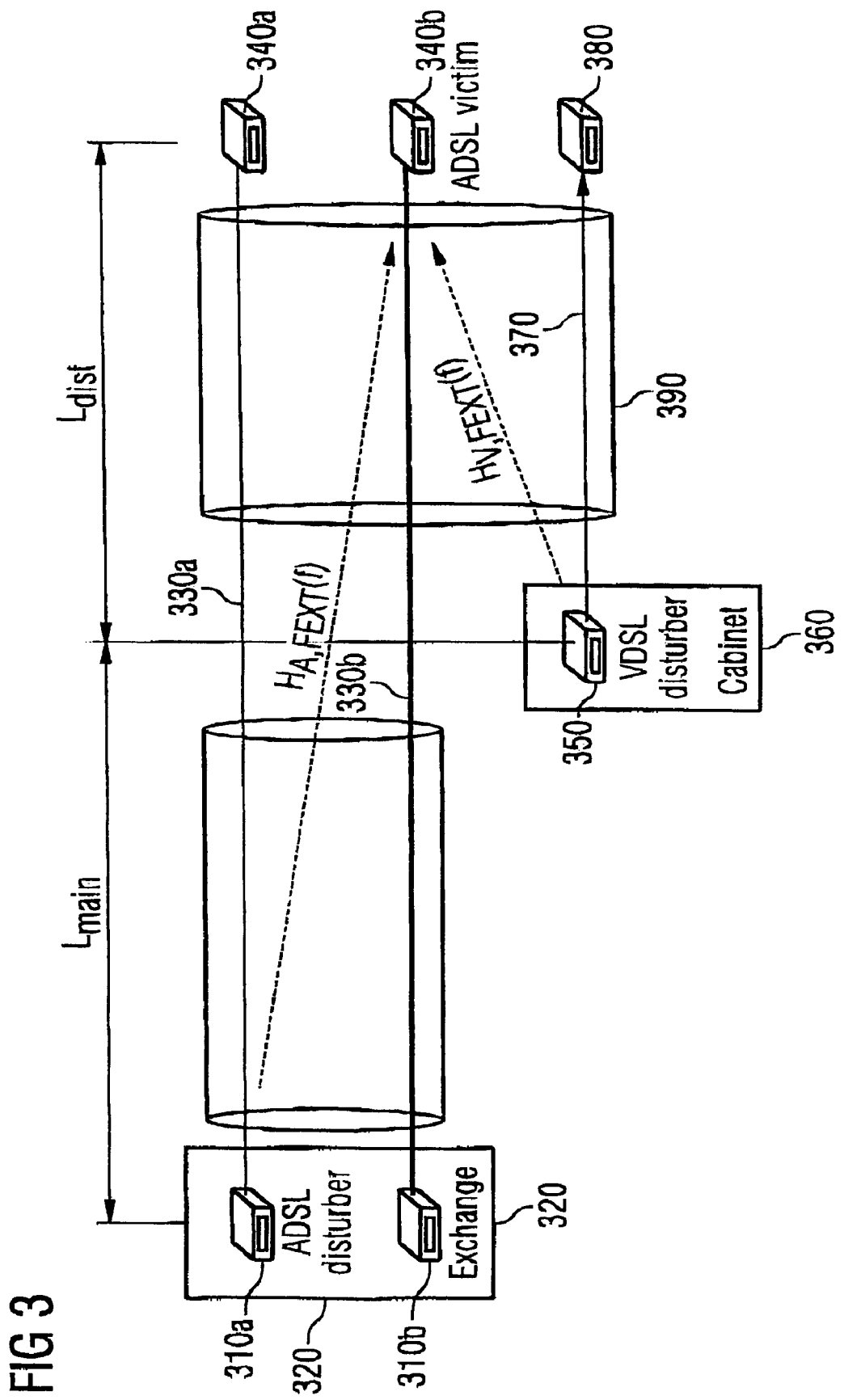
FIG. 3 shows a schematical illustration of a combined ADSL/VDSL network in which embodiments of the present invention may be implemented.

FIG. 3 shows a combined ADSL/VDSL network as an example for an application case of a VDSL DPBO method according to an embodiment of the present invention.

Each of a plurality of modems 310 of an ADSL central office 320 (ADSL-CO) is connected to a different one of a plurality of different ADSL subscriber devices or ADSL terminal devices 340 (ADSL-CPE), respectively, via one of a plurality of wire pair lines 330. In addition, each of a plurality of modems 350 of a VDSL central office 360 (VDSL-CO) is connected to a different one of a plurality of different VDSL subscriber devices or VDSL terminal devices 380 (VDSL-CPE), respectively, via a plurality of wire pair lines 370. The VDSL central office 360 is in a distance $L_{main}$ from the ADSL central office 320. Both the ADSL terminal devices 340 and also the VDSL terminal devices 380 are in a distance $L_{dist}$ from the VDSL central office 360, i.e. the ADSL terminal devices 340 ($L_{main}+L_{dist}$) are remote from the ADSL central office 320.

As any wire pairs, i.e. ADSL and VDSL wire pairs, as indicated by reference numerals 390 in FIG. 3, are located on a section of $L_{dist}$ in a multiple-pair cable bundle 390, in the downstream, i.e. the communication in the direction towards the subscriber devices 340, 380, from the COs 320, 360, the already described far-end cross-talk results (FEXT). This is illustrated as an example in FIG. 3 for a line 330b of the ADSL subscriber device 340b. The transmit signal of the VDSL subscriber 380, i.e. CPE$_0$, with a transfer function $H_{V,FEXT}(f)$ couples over at the length $L_{dist}$ onto the line 330b of the ADSL subscriber 340b. Likewise, the transmit signal of the ADSL subscriber 340a couples across the complete ADSL line length ($L_{main}+L_{dist}$) with the transfer function $H_{A,FEXT}(f)$ over onto line 330b of the ADSL subscriber 340b.

Although it is not indicated in FIG. 3, each modem 350 of the VDSL-CO 360 and each of the VDSL subscriber devices 380 of the network of FIG. 3 includes a transmitter, a receiver and a processor, wherein the functioning and interaction of those internal components and thus also the functioning of the modems 350 and devices 380 themselves in connection with the adjustment of the transmit power density or the downstream power back-off, respectively, may be understood from the following description. It is the aim of the downstream power back-off (DPBO) to reduce the far-end cross-talk of the VDSL lines 380 onto the longer ADSL lines 330. Assuming, a transmission to ADSL subscribers 340b would take place with a maximum transmit power spectral density PSD$_{ADSL}$(f) from the ADSL-CO 320, then its transmit signal would be substantially attenuated already across the line length $L_{main}$. In a distance $L_{main}$ from the ADSL-CO 320, now the VDSL signal for VDSL subscribers 380 would start to couple over into the line of the ADSL subscriber 340b. If now also to the VDSL subscriber 380 a transmission with maximum transmit power spectral density PSD$_{ADSL}$(f) would be performed, then its transmit power spectral density in the distance $L_{main}$ to the ADSL-CO 320 would be substantially higher than that of the already attenuated ADSL signal of the ADSL subscriber 340b. I.e., the far-end cross-talk of the VDSL subscriber 380 onto the ADSL subscriber 340b is higher than the far-end cross-talk of the ADSL subscriber 340a to the ADSL subscriber 340b. Due to the greater interference on the line of the ADSL subscriber 340b, the same may only be offered at a lower data rate as compared to the scenario without VDSL subscriber 380. In order to prevent this and in order to be able to offer the same data rate to any ADSL subscribers, the transmit power spectral density for the VDSL subscribers 380 connected to shorter VDSL lines at the VDSL-CO 360 has to be reduced, so that the request for a respectively equal interference power spectral density may be achieved at the ADSL subscribers 340. This reduction of the transmit power spectral density for the respective VDSL subscribers is—as already described—referred to as Downstream Power Back-Off DPBO.

The ADSL-FEXT transfer function $H_{A,FEXT}(f)$ depending on the frequency of the ADSL line 330a onto the ADSL line 330b is proportional to the ADSL transfer function $H_{main}(f)$ $H_{dist}(f)$ and to the ADSL line length ($L_{main}+L_{dist}$).

$$|H_{A,FEXT}(f)|^2 \sim (L_{main}+L_{dist}) \cdot |H_{main}(f) \cdot H_{dist}(f)|^2 \quad (1)$$

The VDSL-FEXT transfer function $H_{V,FEXT}(f)$ of one of the VDSL lines (DPBO lines) 380 to be formed onto the ADSL line 330b, i.e. one of the VDSL lines which are shorter than ($L_{main}+L_{dist}$), and in which for this reason for the respectively connected VDSL subscriber device the above-plotted adaptation of the downstream transmit power at the VDSL-CO is to be performed, is proportional to the VDSL transfer function $H_{dist}(f)$ and to the VDSL line length $L_{dist}$:

$$|H_{V,FEXT}(f)|^2 \sim L_{dist} \cdot |H_{dist}(f)|^2. \quad (2)$$

The FEXT-PSD resulting from the far-end cross-talk from the ADSL line 330a onto the ADSL line 330b of the ADSL subscriber 340b is given by $$W_{FEXT}(f) = W_{ADSL}(f) \cdot |H_{A,FEXT}(f)|^2 \quad (3)$$

Here, $W_{ADSL}(f)$ designates the fully controlled ADSL downstream spectrum, i.e. the maximum transmit power density for the subscriber devices 340 from the ADSL-CO 320. A similar connection holds true for the far-end cross-talk of the interfering VDSL subscriber 380 onto the ADSL line of the ADSL subscriber 340b.

$$\tilde{W}_{FEXT}(f) = W_{VDSL}(f) \cdot |H_{V,FEXT}(f)|^2 \quad (4)$$

Here, $W_{VDSL}(f)$ designates the VDSL downstream spectrum for the VDSL subscriber 380, including DPBO. That means, $W_{VDSL}(f)$ is the sought-for transmit power spectral density for the VDSL subscriber 380 after the adjustment considering the existing VDSL line length $L_{dist}$.

As already mentioned above, the request for a respectively equal interference power spectral density of any ADSL wire pairs 330 is to be met with the ADSL subscribers 340a,b, i.e. the induced interference power spectral density of the VDSL-CO for a VDSL subscriber 380 with a shorter line length than ($L_{main}+L_{dist}$) should not exceed the interference power spectral density $W_{FEXT}(f)$ of the ADSL-CO 320 for the ADSL subscriber 340a. Expressed mathematically, this means $$\tilde{W}_{FEXT}(f) \leq W_{FEXT}(f). \quad (5)$$

Using few algebraic conversions, now as a request for the sought-for VDSL downstream transmit power spectral density the following results $$W_{VDSL}(f) \leq W_{ADSL}(f)\left(1 + \frac{L_{main}}{L_{dist}}\right) \cdot |H_{main}(f)|^2 \quad (6)$$

The ratio of the line lengths in the form ($1+L_{main}/L_{dist}$) is also considered in order to consider the line length dependency of the FEXT interferences. With the connections between spectral line attenuation a(f) and transfer function H(f) or between spectrum W and spectrum PSD in dB, respectively, $$a(f) = -20 \cdot \log_{10}|H(f)| \text{dB} \quad (7)$$

$$PSD = (10 \cdot \log_{10}(W) + 30)\frac{\text{dBm}}{\text{Hz}} \quad (8)$$

the regulation for determining the spectral DPBO transmit power density of step 230 shown in FIG. 2 results in a logarithmic scale regarding $$PSD_{DPBO}(f) \leq PSD_{ADSL}(f) - a_{main}(f) + 10 \cdot \log_{10}\left(1 + \frac{a_{main}(f_{ref})}{a_{dist}(f_{ref})}\right), \quad (9)$$

wherein $PSD_{DPBO}(f)$ corresponds to the shaped transmit power density, $PSD_{ADSL}(f)$ to the transmit power density of the ADSL system, $a_{main}(f)$ to the attenuation or the electrical length EL, respectively, of the line between the ADSL central office and the VDSL central office and $a_{dist}(f_{ref})$ or $kl_0$, respectively, to the attenuation coefficient of the VDSL line at a reference frequency $f_{ref}=1$ MHz, i.e. $kl_0=a_{dist}(1$ MHz$)$ determined in step 210 by the VDSL subscriber side and then transferred in step 220 from the VDSL-CPE to the VDSL-CO. The thus obtained DPBO transmit power density spectrum $PSD_{DPBO}(f)$ should be adapted for any electrical lengths or line attenuations, respectively, $a_{dist}(f_{ref})$ or $kl_0$ or CL, respectively, of VDSL lines in a cable bundle. The reference frequency $f_{ref}$ may, for example, be in a range of 1 MHz±100 kHz.

The above-described correction value $$a_{corr} = 10 \cdot \log_{10}\left(1 + \frac{EL}{CL}\right) dB \qquad (10)$$

is obtained from equation (9), i.e. using $EL=a_{main}(f_{ref})$ and $CL=a_{dist}(f_{ref})$ or $CL=kl_0$, respectively.

To obtain a more general notation containing no terms from xDSL technology, equation (9) may also be written as $$PSD_1(f) \le PSD_2(f) - a_{12}(f) + 10 \cdot \log_{10}\left(\frac{a_{12}(f_{ref})}{a_1(f_{ref})}\right), \qquad (11)$$

wherein $PSD_1(f)=PSD_{DPBO}(f)$, $PSD_2(f)=PSD_{ADSL}(f)$, $a_{12}(f)=a_{main}(f)$, $a_{12}(r_{ef})=a_{main}(f_{ref})$ and $a_1(f_{ref})=a_{dist}(f_{ref})$.

As described above, a common and known way to select a mean value for CL or $kl_0$, respectively, is for example 6.65 dB, which corresponds to a line length of about 350 meters. If the selected mean value of the electrical length CL or $kl_0$, respectively, is greater than an actual electrical length or line attenuation, respectively, for a VDSL subscriber, then the correction value $a_{corr}$ is accordingly too low for the VDSL subscriber. If, on the other hand, the mean value of CL is smaller than the actual electrical length or line attenuation, respectively, of a subscriber line, then the associated correction value $a_{corr}$ is too large. This means, that in line bundles mainly including short VDSL lines, via the VDSL lines a clearly lower data rate may be transmitted than would be possible with a more accurate knowledge of subscriber-specific values for CL or $kl_0$, respectively. This further means, on the other hand, that in line bundles mainly including long VDSL lines, the VDSL lines cause clearly more cross-talk than ADSL lines running in parallel in the line bundles and thus an ADSL system is only protected insufficiently.

The ITU standards G.993.1, G.993.2 do not provide a measurement of the electrical length CL or $a_{dist}(f_{ref})$ or $kl_0$, respectively, by the VDSL subscriber side. The attenuation coefficient $kl_0$ is here determined in dB by the VDSL-CPE at a frequency of $f_{ref}=1$ MHz and transmitted to the VDSL central office side, i.e. $kl_0=a_{dist}(1$ MHz$)$. In order to achieve a better shaping of the downstream transmit power spectral density in step 230, the VDSL central office uses the attenuation coefficient $kl_0$ measured in step 210 by the VDSL-CPE and transmitted in step 220 for determining the DPBO transmit power density spectrum $PSD_{DPBO}(f)$ according to equation (9).

Downstream Power Back-Off is used in frequency ranges in which ADSL and VDSL systems overlay. If an ADSL connection cannot use the complete available bandwidth due to a long line from ADSL-CO to ADSL subscriber, but only a spectral range up to a maximum frequency $f_{max}$, the shaping of the spectral VDSL downstream transmit power density $PSD_{DPBO}(f)$ is only performed below the maximum frequency $f_{max}$ used by the ADSL system. This maximum frequency $f_{max}$ may be determined based on the distance $L_{main}$ of the ADSL central office from the VDSL central office. Although the value of $f_{max}$ depends on the respective scenario, preferably a value may be determined protecting the ADSL system itself under low-noise conditions, i.e. if only a low far-end cross-talk from VDSL lines to ADSL lines occurs. According to the standard G.997, $f_{max}$ is defined as the frequency fat which a receive power spectral density of the ADSL system is equal to a minimum required value $PSD_{min}$ according to $$PSD_{min}(f)=PSD_{ADSL}(f)-a_{main}(f). \qquad (12)$$

This definition is based on the ADSL-PSD level $PSD_{min}$ at an output of the cable bundle. An attenuation of further distribution cables, so-called cross-connect cables, to the subscribers is neglected here. If a minimum required receive power spectral density of the ADSL system of $PSD_{min}=-107.5$ dBm/Hz is assumed, then $f_{max}$ may be approximated according to $$f_{max} = \left(\frac{250}{(a_{main}(f_{ref}) + a_{dist}(f_{ref}))^{1.185}} - 0.48\right) MHz, \qquad (13)$$

i.e. ADSL carriers above this frequency are not used for data transmission.

VDSL carriers above the frequency $f_{max}$ may generate an additional cross-talk into the used ADSL frequency band below $f_{max}$. A small part of this cross-talk is allowed according to the ITU standard G.997, which leads to the characteristic "PSD stand" of the "stop band PSD" known from the ITU standard G.993. If the cross-talk of the VDSL carriers above $f_{max}$ onto the ADSL transmission band below $f_{max}$ exceeds the level allowed in standard G.997, then VDSL carriers in a range $\Delta f$ above $f_{max}$ should be switched off or reduced regarding their transmission power, respectively. The range $\Delta f$ above $f_{max}$ is referred to as a so-called "guard band".

Figure 4:
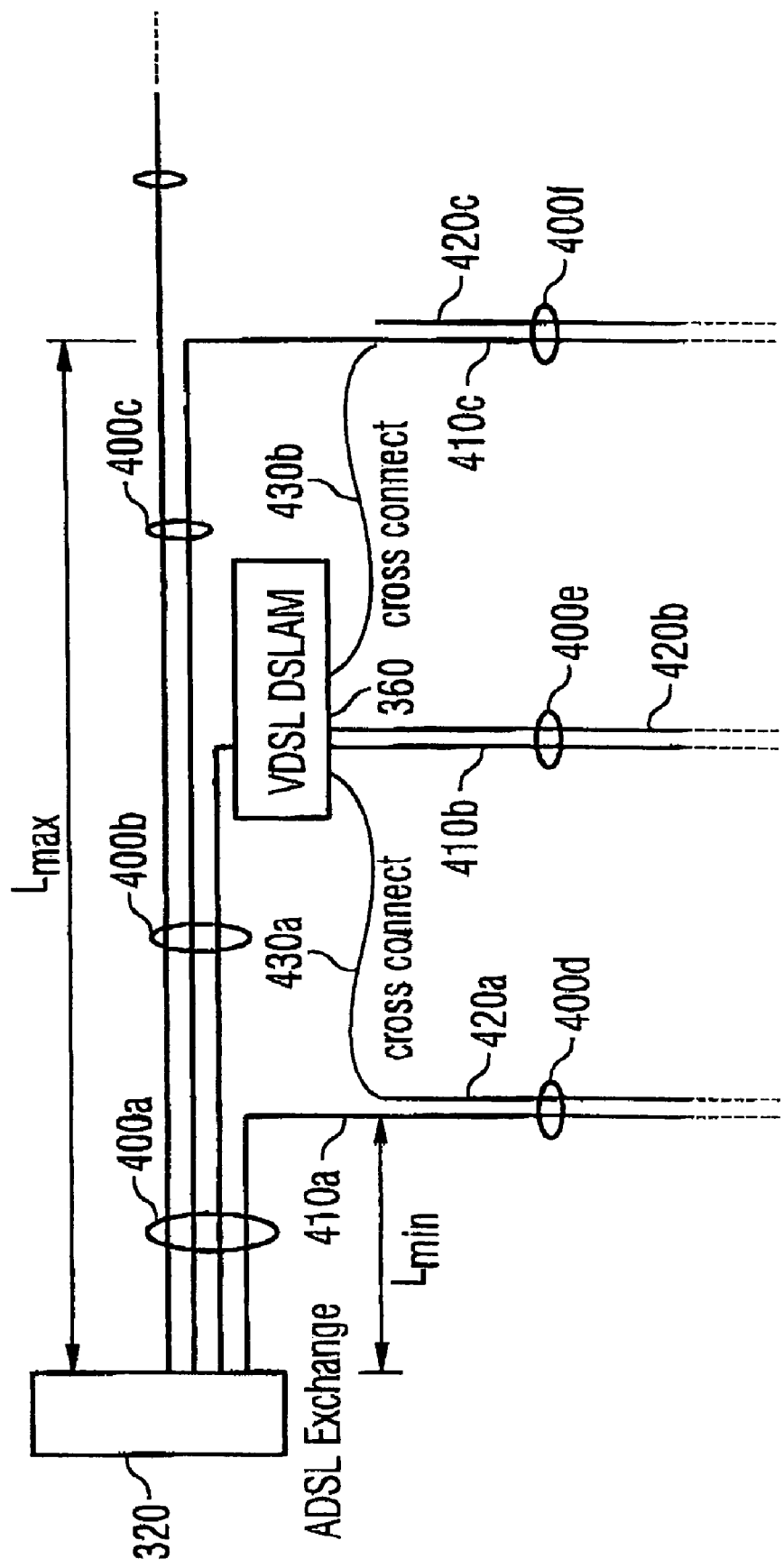
FIG. 4 shows a schematical illustration of a further ADSL/VDSL network in which embodiments of the present invention may be implemented.

FIG. 4 shows a combined ADSL/VDSL system in which a VDSL-CO 360 is connected via cross-connect cables to a plurality of line bundles including both ADSL and also VDSL wire pairs and leading to the respective subscribers.

FIG. 4 shows an ADSL central office 320, a VDSL central office 360 and line bundles 400a-f leading from the ADSL central office 320 or the VDSL central office 360, respectively, to ADSL or VDSL subscriber devices, respectively, not shown in FIG. 4. One ADSL line 410a is led out of the line bundle 400a in a distance $L_{min}$ from the ADSL central office 320 and is combined with a VDSL line 420a to form a line bundle 400d. The line bundle 400d is located in a certain distance from the VDSL central office 360, which is why the VDSL line 420a of the line bundle 400d is connected via a cross-connect cable 430a to the VDSL central office 360. The remaining lines of the line bundle 400a form a line bundle 400b, from which in a distance $L_{main}$ from the ADSL central office 320 the ADSL line 410b is led out and combined, via the VDSL central office 360, with a VDSL line 420b to form a line bundle 400e. The line bundle 400e is directly connected to the VDSL central office 360.

The remaining lines after branching off the ADSL line 410b from the line bundle 400b form a line bundle 400c, from which, in a distance $L_{max}$ from the ADSL central office 320, an ADSL line 410c is led out and combined with a further VDSL line 420c to form a line bundle 400f. The VDSL line 420c of the line bundle 400f is connected to the VDSL central office 360 via a further cross-connect cable 430b.

In the scenario illustrated in FIG. 4, the VDSL lines 420a-c are led to the cable bundles with ADSL lines 400d,e,f in different distances $L_{min}$, $L_{main}$, $L_{max}$ from the ADSL central office 320. The cross-connect cables 430a,b do not contribute to cross-talk here, as they are not led in parallel to the ADSL lines. Thus, in this scenario you cannot talk of a constant distance $L_{main}$ from the ADSL central office 320, in which the VDSL lines are led to the cable bundles with the ADSL lines. By this, the value of the attenuation $a_{main}(f)$ varies in a value range $a_{min}(f)$ for the distance $L_{min}$ and $a_{max}(f)$ for the distance $L_{max}$. In this case it is practically difficult to associate respectively individual $PDS_{DPBO}(f)$ according to equation (9) to the different VDSL lines 420a-c. This would imply, at the VDSL-CO 360, a knowledge about an association between VDSL ports or the VDSL lines 420a-c, respectively, and those distances from the ADSL central office 320, in which the different VDSL lines 420a-c are combined with the different ADSL lines 410a-c in the cable bundles 400d-f.

To protect the ADSL lines in any case, in this case for example a "worst case" $PSD_{DPBO}(f)$ may be associated with the VDSL lines. With such a solution, the minimum distance $L_{min}$ from the ADSL central office 320, in which the VDSL line 420a is led to the cable bundle 400e with the ADSL line 410a, would lead to a minimum attenuation $a_{min}(f)$ between the ADSL central office and the VDSL central office and to the largest value for $f_{max}$, while the maximum distance $L_{max}$, from the ADSL central office 320, in which the VDSL line 420c is supplied to the cable bundle 400f with the ADSL line 410c, leads to a maximum line attenuation $a_{max}(f)$ and thus to a smallest value for $f_{max}$ and a low $PSD_{DPBO}(f)$. These "worst case" values for $f_{max}$ and $a_{main}(f)$ are used by the VDSL-CO for calculating any $PSD_{DPBO}(f)$ to protect all ADSL lines of the system.

If it is assumed that the VDSL central office 360 is arranged in a distance of at least approximately $(L_{min}+L_{max})/2$ from the ADSL central office 320, then the shaping of the $PSD_{DPBO}(f)$ for the VDSL line 420c may be performed in the distance $L_{max}$ from the ADSL central office 320 according to $$PSD_{DPBO}(f) \le PSD_{ADSL}(f) - \frac{a_{min}(f) + a_{max}(f)}{2} + 10 \cdot \log_{10}\left(1 + \frac{a_{min}(f_{ref}) + a_{max}(f_{ref})}{2 \cdot a_{dist}(f_{ref})}\right) \quad (14)$$

The reason for this is, that the attenuation of the cross-connect cable 430b from the VDSL-CO 360 to the VDSL line 420c is considered on a distance $(L_{max}-L_{min})/2$. I.e., at the VDSL-CO 360, first of all an attenuation $a_{main}=(a_{min}+a_{max})/2$ is set. By the cross-connect cable 430b from the VDSL-CO 360 to the VDSL line 420c a signal is again attenuated by approximately $(a_{max}-a_{min})/2$ so that the power density $PSD_{DPBO}(f)$ for the VDSL line 420c at the end of the cross-connect cable 430b is approximately correct again.

As already described above, the maximum frequency $f_{max}$ for the shaping of the $PSD_{DPBO}(f)$ for the scenario in FIG. 4 may be determined by $$PSD_{min}(f)=PSD_{ADSL}(f)-a_{min}(f). \quad (15)$$

If a minimum required receive transmit power spectral density of the ADSL system is assumed to be $PSD_{min}=-107.5$ dBm/Hz, $f_{max}$ may be determined for the scenario illustrated in FIG. 4 according to $$f_{max} = \left(\frac{250}{(a_{min}(f_{ref}) + a_{dist}(f_{ref}))^{1.185}} - 0.48\right)\text{MHz} \quad (16)$$

As all details of the networks of FIG. 3 and FIG. 4 and the mathematical basis have been explained above, in the following with reference to FIG. 5 a device for adjusting a transmit power spectrum at the central transmit/receive means of a communication network is explained according to an embodiment of the present invention.

Figure 5:
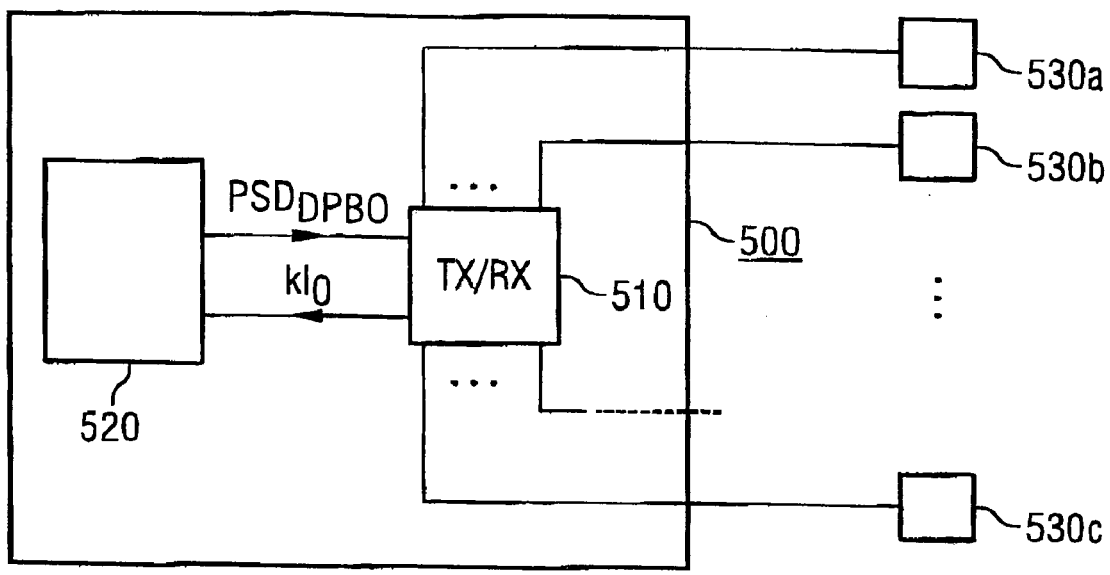
FIG. 5 shows a device for adjusting the transmit power density of a transmit/receive device according to an embodiment of the present invention.

FIG. 5 shows a device 500 for adjusting a transmit power spectrum of a central transmit/receive means, for example a VDSL-CO, having a means 510 for receiving an attenuation measure which is coupled to a means 520 for determining the transmit power spectrum of the transmit/receive means 500. The means 510 for receiving an attenuation measure is coupled to subscriber devices 530a-c via lines.

The means 510 for receiving an attenuation measure $kl_0$ from the respective subscriber devices 530a-c could, for example, be a transmit/receive modem. The transmit/receive modem 510 is coupled to the means 520 for determining the transmit/power spectrum, i.e. to a transmit power spectrum adjuster via a receive data output. Via this receive data output the attenuation coefficient $kl_0$ received from one of the subscriber devices 530a-c is transferred from the transmit/receive modem 510 to the transmit power spectrum adjuster 520. The same determines, based on the received attenuation measure $kl_0$, the transmit power spectrum of the transmit/receive device 500 for a communication with the respective subscriber device 530a-c. The information regarding the determined transmit power spectrum is transmitted to the transmit/receive modem 520 from the transmit power spectrum adjuster via an output coupled to a transmit power spectrum adjustment input of the transmit/receive modem 520. The same adjusts the transmit power spectral density $PSD_{DPBO}(f)$ for a communication with the corresponding subscriber device.

The device 500 described in FIG. 5 for adjusting a transmit power spectrum might, for example, be implemented in a VDSL central office.

Figure 6:
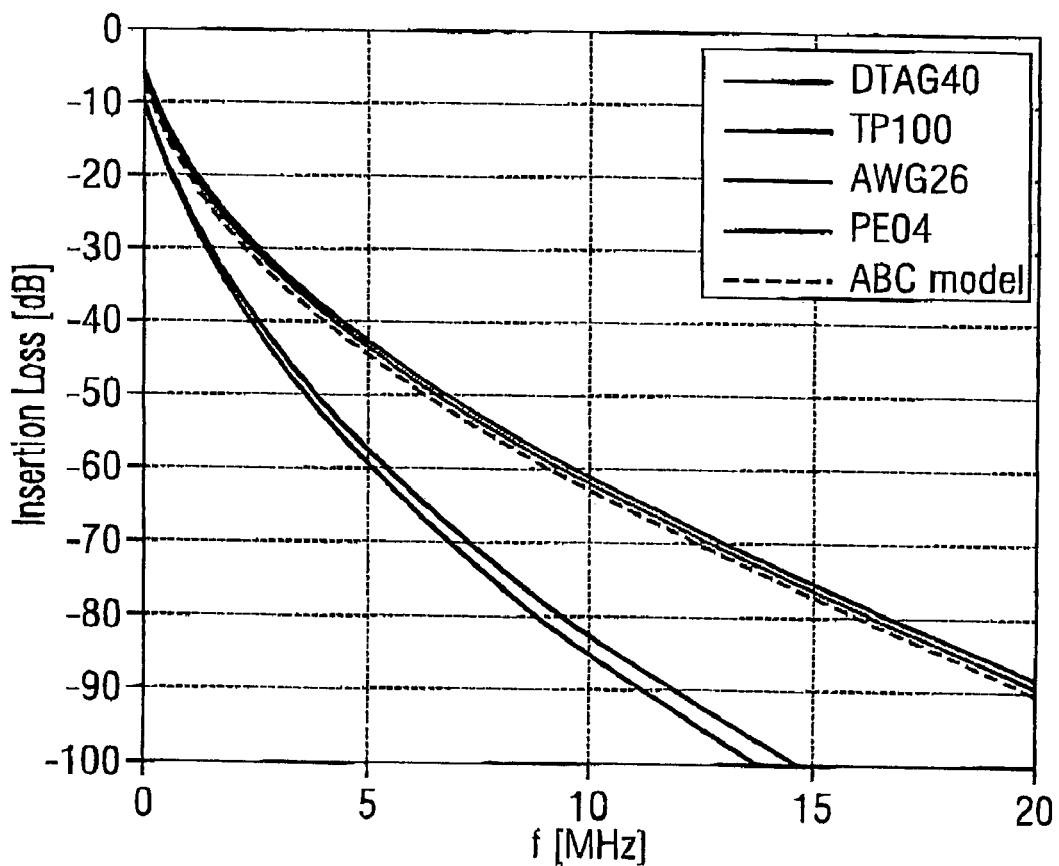
FIG. 6 shows a comparison of different line attenuations plotted across a frequency depending on different cable models.

The line attenuation $a_{main}(f)$ of the ADSL lines already mentioned above between the ADSL central office and the VDSL central office may, for example, be determined by the fact that certain mathematical models are used for used lines or cables, respectively. For this purpose, FIG. 6 shows frequency-dependent cable attenuations for cables of a physical length of 1000 meters, determined with different cable models.

According to the ITU standard G.997, the cable attenuation $a_{main}(f)$ may be approximated with three parameters A', B' and C' according to $$a_{main}(f,L_{main})=(A'+B'\cdot\sqrt{f}+C'\cdot f)\cdot L_{main} \quad (17)$$

The parameters A', B' and C' are usually selected such that the frequency f may be indicated in MHz and the line length $L_{main}$ in kilometers. For a so-called DTAG-40 cable, for example, the parameters result A'=1,
B'=17.2 and
C'=0.62.

Further, according to the ITU standard G.997, for the cable attenuation $a_{main}(f)$ a similar formula may be given according to $$a_{main}(f, EL) = (A + B \cdot \sqrt{f} + C \cdot f) \cdot EL \quad (18)$$

The parameter EL stands for the attenuation of the cable in dB with a frequency f=1 MHz and is designated as the electrical length, i.e. the electrical length EL corresponds to $$EL = a_{main}(1 \text{ MHz}, 1 \text{ km}) = A' + B' + C'. \quad (19)$$

Further, the coefficients A, B, C may be determined from the coefficients A', B', C', respectively, by a division of A', B', C' by (A'+B'+C'). The coefficients for the DTAG-40 cable result according to G.997 to be A=0.0531,
B=0.9139 and
C=0.0329.

For the case that the DTAG-40 model is used for the DPBO, an electrical length EL of the cable has to be configured from the ADSL central office to the VDSL central office. Here, EL is defined at a frequency of f=1 MHz.

For the scenario described with reference to FIG. 4, in which VDSL lines are supplied after different distances from ADSL-CO cable bundles with ADSL lines, according to the above-described methods, the electrical length EL is calculated according to $$EL = (EL_{min} + EL_{max})/2. \quad (20)$$

The mean value EL is here used as a mean cable attenuation, while $EL_{min}$ is used to determine the maximum frequency $f_{max}$ of the ADSL connection, as already described above.

The downstream PSD $PSD_{DPBO}$ resulting according to methods according to an embodiment of the present invention is shown in FIG. 7 for different line attenuations or electrical lengths EL, respectively, of the ADSL lines between the ADSL central office and the VDSL central office.

FIG. 7 shows all in all twelve masks for downstream power back-off PSDs $PSD_{DPBO}(f)$. The masks in dashed lines correspond to the DPBO-PSDs adjusted according to the standard ITU G.997. The DPBO-PSDs illustrated in solid lines correspond to the DPBO-PSDs adjusted according to a method according to an embodiment of the present invention.

The PSD mask for the electrical length EL=0 dB is designated by the reference numeral 700. The mask for $PSD_{DPBO}(f)$ determined according to the method according to an embodiment of the present invention for an electrical length EL=15 dB is designated by the reference numeral 710, while the standard mask for $PSD_{DPBO}(f)$ has the reference numeral 711. The mask for $PSD_{DPBO}(f)$ determined according to a method according to an embodiment of the present invention is shown with the reference numeral 720 for a line with an electrical length of 30 dB, while the mask for $PSD_{DPBO}(f)$ according to the standard method has the reference numeral 721. The mask for $PSD_{DPBO}(f)$ for EL=45 dB according to the method according to an embodiment of the present invention has the reference numeral 730, that of the standard method 731. Further, the mask for $PSD_{DPBO}(f)$ according to the method according to an embodiment of the present invention for EL=65 dB is designated by 740 and that of the standard method by 741. Finally, a mask for $PSD_{DPBO}(f)$ according to the method according to an embodiment of the present invention for EL=90 dB has the reference numeral 750, while the mask for $PSD_{DPBO}(f)$ for the same electrical length according to the standard method has the reference numeral 751.

As it is obvious for a person skilled in the art, an electrical length EL=0 dB means that a downstream power back-off does not take place, i.e. a transmission is possible from the VDSL-CO with a transmit power spectral density according to $PSD_{ADSL}(f)$. The electrical length EL=15 dB corresponds to a relatively short distance between the ADSL central office and the VDSL central office. Due to the relatively short length of a line between the two central offices, an ADSL connection may use a relatively large bandwidth. For the scenario illustrated in FIG. 7, a maximum used ADSL frequency of approximately $f_{max}$=2.2 MHz for EL=15 dB results. Only up to this frequency $f_{max}$ is a shaping of the $PSD_{DPBO}(f)$ by the VDSL central office required, as illustrated in FIG. 7. As in FIG. 7 PSD masks are dealt with, the above-mentioned guard band above $f_{max}$ is not shown. For the larger electrical lengths further illustrated in FIG. 7 accordingly lower maximum frequencies $f_{max}$ result which are not usable for the ADSL system.

In FIG. 7 it may be seen that, using the method for setting or adjusting, respectively, the transmit power spectrum of the VDSL central office according to an embodiment of the present invention, generally larger transmit power spectral densities $PSD_{DPBO}(f)$ may be achieved as compared to the standard method. Accordingly, using the method according to an embodiment of the present invention, higher data rates may be achieved for VDSL users without having a detrimental effect on the ADSL system.

It is a further advantage of embodiments of the present invention that an xDSL network operator of a communication network including both ADSL terminals and also VDSL terminals has the possibility to shape the transmit power spectral density of each VDSL connection based on the associated electrical length CL or $kl_0$, respectively, of the VDSL line. Thereby, the cross-talk of each VDSL connection in a cable bundle has at least approximately the same course of the spectral power density, independent of the individual VDSL line lengths.

As a conclusion, according to an embodiment of the present invention, a request for a respectively equal interference power density of the VDSL connections in a cable bundle is approached such that the transmit power spectral density of each VDSL connection is shaped based on the associated electrical length CL or $kl_0$, respectively, of the VDSL line. The electrical length CL or $kl_0$, respectively, is estimated by the subscriber side and transmitted to the VDSL central office. From this estimate of the electrical lengths CL or $kl_0$, respectively, the VDSL central office determines a correction value $a_{corr}$ and uses the same to adjust the transmit power spectral density for the downstream $PSD_{DPBO}(f)$ to the subscriber side.

In particular it is to be noted that, depending on the circumstances, the inventive scheme may also be implemented in software. The implementation may take place on a digital storage medium, in particular a floppy disc or a CD having electronically readable control signals which may cooperate with a programmable computer system so that the corresponding method is performed. In general, the invention thus also consists in a computer program product having a program code stored on a machine-readable carrier for performing the inventive method when the computer program product runs on a computer. In other words, the invention may thus be realized as a computer program having a program code for performing the method, when the computer program product runs on a computer.

Further, it is to be noted that the steps in FIG. 2 may also be regarded as individual means of the VDSL-CPE or the VDSL- CO, respectively, which take over the respective function and are, as an example, implemented as software, in FPGA or an ASIC circuit component.

It is further to be noted that the term "modem" is to be regarded broadly and in its general form includes a device, an interface or a program serving for transferring information, for example, via cable lines.

Although the embodiments were described regarding VDSL communication, other embodiments may relate to any other type of data communication, for example to other xDSL communications like ADSL or HDSL, which may again be combined with any other type of data communication, like, for example, other types of xDSL communications.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for adjusting a transmit power spectrum of a VDSL transmitter/receiver of a communication network, comprising:
    a means for receiving, from a VDSL subscriber device, an attenuation measure for an attenuation experienced by a signal on a line from the VDSL transmitter/receiver to the VDSL subscriber device; and
    a means for determining the transmit power spectrum of the VDSL transmitter/receiver for a communication of the VDSL transmitter/receiver with the VDSL, subscriber device based on the received attenuation measure, wherein the means for determining is further operable to determine the transmit power spectrum of the VDSL transmitter/receiver based on a transmit power spectrum of an ADSL, transmitter/receiver and a reference attenuation, the reference attenuation corresponding to an attenuation experienced by a signal on a portion of a line between the ADSL, transmitter/receiver and an ADSL subscriber device, the portion corresponding to a distance between the VDSL transmitter/receiver and the ADSL transmitter/receiver.

2. A device for adjusting a transmit power spectrum of a first transmitter/receiver of a communication network, comprising:
    a means for receiving, from a first subscriber device, an attenuation measure for an attenuation experienced by a signal on a line from the first transmitter/receiver to the first subscriber device; and
    a means for determining the transmit power spectrum of the first transmitter/receiver for a communication of the first transmitter/receiver with the first subscriber device based on the received attenuation measure, wherein the means for determining is further operable to determine the transmit power spectrum of the first transmitter/ receiver based on a transmit power spectrum of an second transmitter/receiver and a reference attenuation, the reference attenuation corresponding to an attenuation experienced by a signal on a portion of a line between the second transmitter/receiver and a second subscriber device,
    wherein the transmit power spectrum of the first transmitter/receiver determined by the means for determining depends on $$PSD_2(f) - a_{12}(f) + 10 \cdot \log_{10}\left(\frac{a_{12}(f_{ref})}{a_1(f_{ref})}\right)$$

wherein f corresponds to a frequency, $PSD_2(f)$ corresponds to a transmit power spectral density of the second transmitter/receiver of the communication network depending on the frequency f, $a_{12}(f)$ corresponds to the reference attenuation a signal experienced on the portion of the line between the second transmitter/receiver and the first transmitter/receiver depending on the frequency f, $f_{ref}$ corresponds to a reference frequency to which the attenuation measure is related to, $a_1(f_{ref})$ corresponds to the attenuation measure determined by and received from the first subscriber device, and $a_{12}(f_{ref})$ corresponds to an attenuation measure experiences on the portion of the line between the second transmitter/receiver and the first transmitter/receiver depending on the reference frequency.

3. The device according to claim 2, wherein the reference frequency is in a range of 1 MHz±100 kHz.

4. A central office, comprising a transmit/receive modem comprising a transmit data input, a receive data output, an external interface capable of being coupled to a first subscriber device via a line, and a transmit power spectrum adjustment input; and a transmit power spectrum adjuster comprising an output capable of being coupled to the transmit power spectrum adjustment input, and an input coupled to the receive data output, wherein a transmit power spectrum adjusted by the transmit power spectrum adjuster depends on $$PSD_2(f) - a_{12}(f) + 10 \cdot \log_{10}\left(\frac{a_{12}(f_{ref})}{a_1(f_{ref})}\right)$$

wherein f corresponds to a frequency, $a_{12}(f)$ corresponds to a reference attenuation, depending on the frequency f, which a signal experiences on a portion of a line between a second, central office and a second subscriber device, $PSD_2(f)$ corresponds to a transmit power spectrum of the second central office depending on the frequency f, and wherein $f_{ref}$ corresponds to a reference frequency and $a_1(f_{ref})$ to a measure for an attenuation determined by and received from the first subscriber device, which a signal experiences on a line from the central office to the first subscriber device connected to the central office, and $a_{12}(f_{ref})$ corresponds to an attenuation measure experiences on the portion of the line between the second central office and the central office depending on the reference frequency.

5. The central office according to claim 4, wherein the reference frequency is in a range of 1 MHz.±100 kHz.

6. A network, comprising a first central office coupled to a first subscriber device via a first line of a line bundle and comprising a first transmit power spectrum $PSD_1(f)$; a second central office coupled, from a point of the line bundle between the first central office and the first subscriber device, via a second line of the line bundle to a second subscriber device, and wherein the second central office comprises a second transmit power spectrum $PSD_2(f)$, wherein $PSD_2(f)$ is at least approximately dependent on $$PSD_1(f) = a_{12}(f) + 10 \cdot \log_{10}\left(\frac{a_{12}(f_{ref})}{a_2(f_{ref})}\right)$$

wherein f corresponds to a frequency, $a_{12}(f)$ corresponds to a reference attenuation depending on the frequency f, the reference attenuation corresponding to a signal attenuation on the first line between the first central office and the first subscriber device from the first central office up to the point, and wherein $f_{ref}$ corresponds to a reference frequency and $a_2(f_{ref})$ to an attenuation measure determined by and received from the second subscriber device, the attenuation measure representative of attenuation that is experienced by a signal on the second line from the second central office to the second subscriber device with regard to the reference frequency, and $a_{12}(f_{ref})$ corresponds to an attenuation measure representative of attenuation that is experienced by a signal on the first line from the first central office to the point depending on the reference frequency.

7. The network according to claim 6, wherein the second central office is connected, via a plurality of second lines, to a plurality of second subscriber devices, and the first central office is connected, via a plurality of first lines, to a plurality of first subscriber devices, wherein the plurality of first lines between the first central office and the point comprise at least partially different lengths and run from the point on in the direction of the first subscriber devices at least in pairs with respectively one of the plurality of second lines, wherein $a_{12}(f)$ corresponds to a value between $a_{12},min(f)$ and $a_{12},max(f)$, wherein $a_{12},min(f)$ corresponds to the minimum reference attenuation depending on a frequency f, the minimum reference attenuation representative of attenuation experienced by a signal on one of the plurality of first lines between the first central office and the plurality of first subscriber devices from the first central office up to the point, and wherein $a_{12},max(f)$ corresponds to a maximum reference attenuation depending on a frequency f, the maximum reference attenuation representative of attenuation experienced by a signal on one of the plurality of first lines between the first central office and the plurality of first subscriber devices from the first central office up to the point.

8. The network according to claim 6, wherein the reference frequency is in a range of 1 MHz±100 kHz.

9. The network according to claim 6, wherein the network includes a wire-bonded network.

10. The network according to claim 9, wherein the network includes an XDSL network.

11. The network according to claim 9, wherein the network includes a combined ADSL/VDSL network.

12. A method for adjusting a transmit power spectrum of a first transmitter/receiver of a communication network, comprising:
  receiving, from the first subscriber device, a measure for an attenuation experienced by a signal on a line from the first transmitter/receiver to a first subscriber device of the communication network; and
  determining the transmit power spectrum of the first transmitter/receiver for a communication of the first transmitter/receiver with the first subscriber device based on the received attenuation measure, wherein determining is based on a transmit power spectrum of a second transmitter/receiver and a reference attenuation, the reference attenuation representative of attentuation experienced by a signal on a portion of a line between the second transmitter/receiver and a second subscriber device; and
  wherein in determining the determined transmit power spectrum of the first transmitter/receiver depends on $PSD_2(f) = a_{12}(f) + 10 \log_{10}(a_{12}(f_{ref})/a_1(f_{ref}))$, wherein f corresponds to a frequency, $PSD_2(f)$ corresponds to a transmit power spectrum of the second transmitter/receiver of the communication network depending on the frequency f, wherein $a_{12}(f)$ corresponds to the reference attenuation depending on the frequency f, the reference attenuation corresponding to a signal attenuation on the first line between the second transmitter/receiver and the first transmitter/receiver, $f_{ref}$ corresponds to a reference frequency to which the attenuation measure is related to, $a_1(f_{ref})$ corresponds to the attenuation measure determined by and received from the first subscriber device, and $a_{12}(f_{ref})$ corresponds to an attenuation measure on a portion of a line between the second transmitter/receiver and the first transmitter/receiver depending on the reference frequency.

13. The method according to claim 12, wherein in determining the reference frequency is in a range of 1 MHz.±100 kHz.

14. A method for adjusting a transmit power spectrum of a first transmitter/receiver of a communication network, comprising:
  determining a measure for an attenuation experienced by a signal on a line from the first transmitter/receiver to a first subscriber device of the communication network;
  transferring the determined measure for the attenuation from the first subscriber device to the first transmitter/receiver; using the transferred attenuation measure for determining the transmit power spectrum of the first transmitter/receiver; and
  using the determined transmit power spectrum for a communication of the first transmitter/receiver with the first subscriber device, wherein in using the transferred attenuation measure for determining the transmit power spectrum the determination is based on a transmit power spectrum of a second transmitter/receiver and a reference attenuation, the reference attenuation representative of attenuation experienced by a signal on a portion of a line between the second transmitter/receiver and a second subscriber device; and
  wherein in using the transferred attenuation measure for determining the transmit power spectrum the determination of the transmit power spectrum depends on $$PSD_2(f) = a_{12}(f) + 10 \cdot \log_{10}\left(\frac{a_{12}(f_{ref})}{a_1(f_{ref})}\right)$$

wherein f corresponds to a frequency, $PSD_2(f)$ corresponds to a transmit power spectrum of the second transmitter/receiver of the communication network depending on the frequency f, wherein $a_{12}(f)$ corresponds to the reference attenuation depending on the frequency f, the reference attenuation corresponds to the portion of the line between the second transmitter/receiver and the first transmitter/receiver depending on the reference frequency, $f_{ref}$ corresponds to a reference frequency to which the attenuation measure is related to, $a_1(f_{ref})$ corresponds to the attenuation measure determined by and received from the first subscriber device, and $a_{12}(f_{ref})$ corresponds to an attenuation measure on a portion of a line between the second transmitter/receiver and the first transmitter/receiver depending on the reference frequency.

15. The method according to claim 14, wherein in determining the reference frequency is in a range of 1 MHz.±100 kHz.

16. A digital storage medium storing a computer program, when executed by a computer, performs a method for adjusting a transmit power spectrum of a first transmitter/receiver of a communication network, comprising: receiving from a subscriber device a measure for an attenuation experienced by a signal on a line from the first transmitter/receiver to the subscriber device of the communication network, and determining the transmit power spectrum of the first transmitter/receiver for a communication of the first transmitter/receiver with the first subscriber device based on the received attenuation measure, wherein the computer program is implemented such that in the method of determination of the transmit power spectrum $PSD_1(f)$ of the first transmitter/receiver is performed according to $$PSD_1(f) \leq PSD_2(f) - a_{12}(f) + 10 \cdot \log_{10}\left(\frac{a_{12}(f_{ref})}{a_2(f_{ref})}\right)$$

wherein f corresponds to a frequency, $PSD_2(f)$ corresponds to a transmit power spectrum of the second transmitter/receiver of the communication network depending on the frequency f, and wherein $a_{12}(f)$ corresponds to the reference attenuation depending on the frequency f which a signal experiences on a line between a second transmitter/receiver and a second subscriber device from the second transmitter/receiver up to a point, from which on a line leads from the first transmitter/receiver leads to the first subscriber device, and wherein $f_{ref}$ corresponds to a reference frequency which the attenuation measure is related to, $a_1(f_{ref})$ corresponds to the attenuation measure determined by and received from the first subscriber device, and $a_{12}(f_{ref})$ corresponds to an attenuation measure on a portion of a line between the second transmitter/receiver and the first transmitter/receiver depending on the reference frequency.

17. The digital storage medium according to claim 16, wherein the program code is implemented such that in the method $f_{ref}$ is in a range of 1 MHz.±100 kHz.

* * * * *